(12) United States Patent
Ohlig

(10) Patent No.: US 8,047,618 B2
(45) Date of Patent: Nov. 1, 2011

(54) BRAKE SYSTEM FOR A MOTOR VEHICLE

(75) Inventor: Benedikt Ohlig, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 891 days.

(21) Appl. No.: 11/988,682

(22) PCT Filed: Jun. 28, 2006

(86) PCT No.: PCT/EP2006/006258
§ 371 (c)(1),
(2), (4) Date: Jan. 11, 2008

(87) PCT Pub. No.: WO2007/009561
PCT Pub. Date: Jan. 25, 2007

(65) Prior Publication Data
US 2009/0108670 A1    Apr. 30, 2009

(30) Foreign Application Priority Data

Jul. 15, 2005 (DE) .......................... 10 2005 033 258

(51) Int. Cl.
*B60T 13/16* (2006.01)
*B60T 8/40* (2006.01)
*B60T 8/44* (2006.01)

(52) U.S. Cl. .................. 303/11; 303/114.1; 303/116.1; 303/20

(58) Field of Classification Search .................. 303/10, 303/11, 20, 116.1, 116.2, 114.1, 114.2, DIG. 11
See application file for complete search history.

(56) References Cited

U.S. PATENT DOCUMENTS

| 4,824,183 | A |   | 4/1989 | Uchida et al. |
| 4,950,038 | A |   | 8/1990 | Ocvirk et al. |
| 5,411,326 | A | * | 5/1995 | Linhoff ...................... 303/116.2 |
| 5,741,050 | A |   | 4/1998 | Ganzel et al. |
| 6,120,111 | A |   | 9/2000 | Sakai |
| 6,290,307 | B1 |  | 9/2001 | Poertzgen et al. |
| 6,752,473 | B2 | * | 6/2004 | Yang ......................... 303/116.2 |
| 7,127,891 | B2 |  | 10/2006 | Ohlig et al. |
| 7,296,861 | B2 |  | 11/2007 | Ohlig et al. |
| 2006/0033383 | A1 | * | 2/2006 | Ohlig et al. ..................... 303/10 |
| 2006/0186733 | A1 | * | 8/2006 | Drumm ....................... 303/114.1 |
| 2006/0220451 | A1 | * | 10/2006 | Drumm ....................... 303/114.1 |
| 2008/0018171 | A1 | * | 1/2008 | Ohlig et al. ..................... 303/10 |

FOREIGN PATENT DOCUMENTS

| DE | 38 14 045 A1 | 11/1989 |
| DE | 195 42 656 A1 | 5/1997 |
| DE | 103 11 060 A1 | 10/2004 |
| DE | 103 18 850 A1 | 11/2004 |
| DE | 103 37 511 A1 | 4/2005 |
| GB | 2 132 294 A | 7/1894 |

* cited by examiner

*Primary Examiner* — Thomas J Williams
(74) *Attorney, Agent, or Firm* — MacMillan, Sobanski & Todd, LLC

(57) ABSTRACT

A braking system for a motor vehicle includes a hydraulic circuit for producing a brake force, the hydraulic circuit having a pressure source for producing a hydraulic pressure and a pressure store, the pressure store of the hydraulic circuit being able to be supplied with hydraulic fluid from a delivery side of the pressure source if necessary. In this braking system, there is provision for the pressure store to be able to be coupled in fluidic terms to an intake side of the pressure source by means of an interposed actively controllable multi-way valve, in particular a two-way solenoid valve, and for the pressure store to be able to be decoupled therefrom.

13 Claims, 1 Drawing Sheet

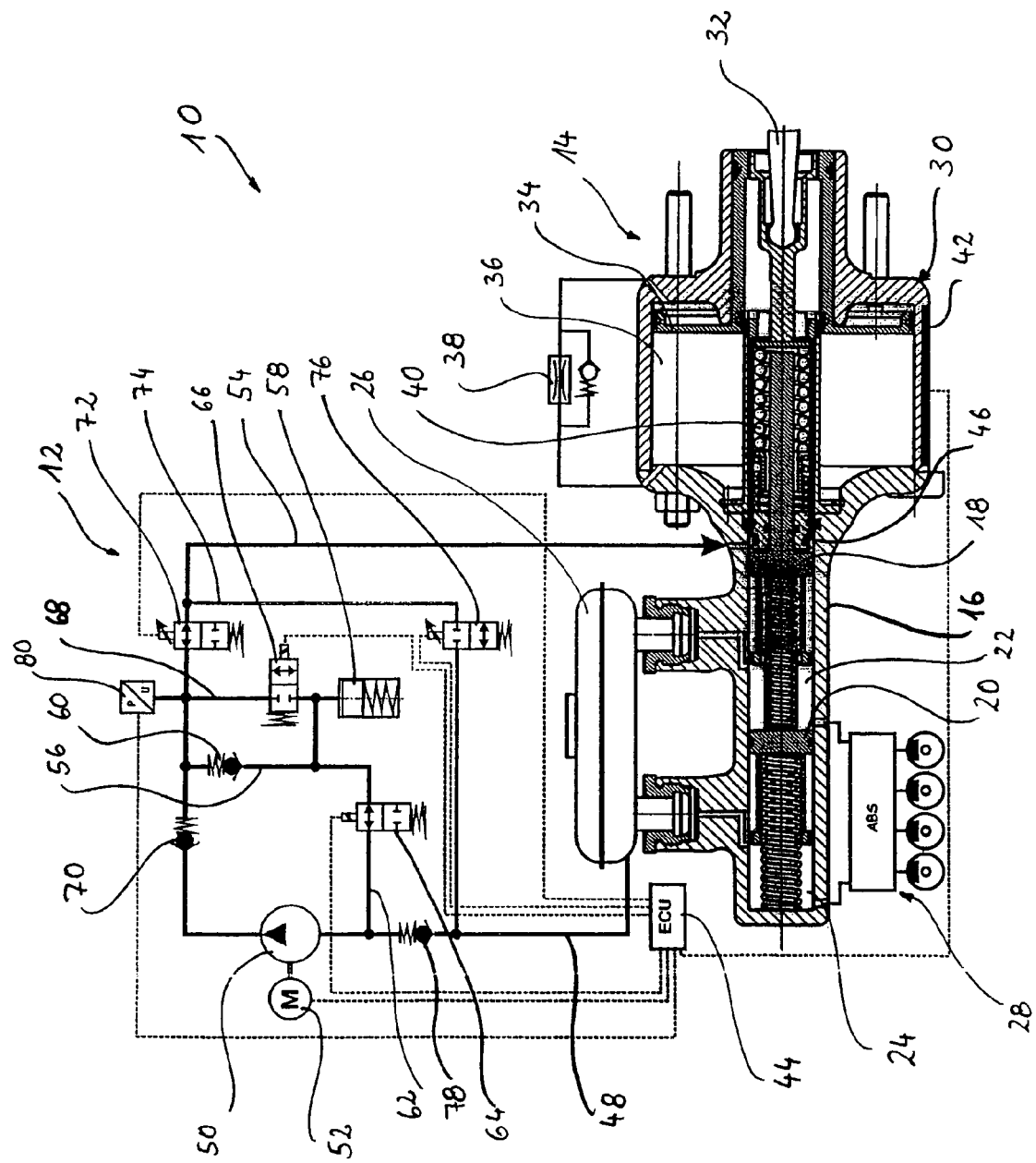

BRAKE SYSTEM FOR A MOTOR VEHICLE

CROSS-REFERENCE TO RELATED APPLICATIONS

This application is a continuation of International Application No. PCT/EP2006/006258 filed Jun. 28, 2006, and which claimed priority to German Patent Application No. 10 2005 033 258.7 filed Jul. 15, 2005, the disclosures of which are incorporated herein by reference.

BACKGROUND OF THE INVENTION

Various embodiments of a braking system for a motor vehicle are described herein. In particular, a braking system for a motor vehicle includes a hydraulic circuit for producing a braking force, the hydraulic circuit having a pressure source for producing a hydraulic pressure and a pressure store, the pressure store of the hydraulic circuit being able to be supplied with hydraulic fluid from a delivery side of the pressure source if necessary.

A braking system of this type is already known from the prior art. For instance, document DE 103 18 850 A1, and corresponding U.S. Pat. No. 7,296,861 B2, both of which are incorporated by reference herein, discloses a braking system in which the pressure store can be supplied with hydraulic fluid in accordance with the servo pressure present in the servo pressure circuit. The pressure store serves to compensate for pressure fluctuations in a braking operation. This prior art makes provision for the pressure store to be supplied with hydraulic fluid substantially only when the hydraulic pressure provided by the pressure source is freely available and does not have to be used in another manner, for example, in the context of a braking operation. However, this arrangement has the disadvantage that the pump must be constructed so as to be relatively powerful since the pressure differential present at the pump is relatively large. The pump has to pump hydraulic fluid from the pressure-free fluid reservoir into the servo pressure circuit which is in a state of relatively high pressure. Furthermore, owing to the relatively high pressure differential between the intake side and the delivery side, particularly at the beginning of the braking operation, the pump must be able to react in a very dynamic manner. The pump which must be constructed so as to be correspondingly powerful leads to increased costs for the braking system. Furthermore, when the pump is driven, the on-board electrical power network is also placed under relatively high loads.

A similar arrangement is further disclosed in the document GB 2 132 294A. In this document, the pump which must be constructed so as to be relatively powerful also conveys hydraulic fluid from the pressure-free pressure store into the fluid system which is in a state of relatively high pressure. The same disadvantages arise as set out above for the braking system according to DE 103 18 850 A1.

With regard to additional prior art, reference is generally made to the documents DE 195 42 656 A1, and corresponding U.S. Pat. No. 6,290,307 B1, both of which are incorporated by reference herein, DE 103 37 511 A1 and DE 103 11 060 A1, and corresponding U.S. Pat. No. 7,127,891 B2, both of which are incorporated by reference herein, which all disclose braking systems wherein a pressure store alone can be coupled or is coupled to the delivery side of the pressure source.

Finally, document DE 38 14 045 A1, and corresponding U.S. Pat. No. 4,950,038, both of which are incorporated by reference herein, discloses a braking system having an intermediate fluid store, the hydraulic fluid which is temporarily stored therein in a substantially pressure-free state being permanently available at the intake side of the pump.

BRIEF SUMMARY OF THE INVENTION

The present application describes various embodiments of a braking system. A first embodiment of a braking system of the type mentioned in the introduction which, with a pressure source which is constructed with a relatively low level of power and which is therefore cost-effective, can already provide a relatively high hydraulic fluid pressure at the beginning of the braking operation.

In the first embodiment of a braking system of the type mentioned in the introduction in which there is provision for the pressure store to be able to be coupled in fluidic terms to an intake side of the pressure source by means of an interposed actively controllable multi-way valve, in particular a two-way solenoid valve, and to be able to be decoupled therefrom.

Owing to the possibility according to the first embodiment of the braking system of coupling the pressure store to the intake side of the pressure source, in particular a motor-driven pump, by means of an actively controllable multi-way valve, or of decoupling the pressure store therefrom, the fluid pressure stored in the pressure store can be used to reduce the pressure differential at the pump. The intake side of the pressure source is thereby acted on in a substantially pressure-loss-free manner with a hydraulic primary pressure which corresponds to the loading pressure of the pressure store so that the pressure differential which is produced at the pressure source in the context of the braking operation is significantly reduced. On the whole, the pressure pump can thereby be more readily actuated, so that it can also react more quickly and reach a relatively high pressure level in a relatively short time. Furthermore, it is possible to use a pressure source or pump which is constructed with a less powerful motorised drive, which is more cost-effective and which places less strain on the on-board electrical power network than in the configurations according to the prior art.

In another embodiment of the braking system, with regard to the construction of the braking system, there is provision for the braking system to have a main brake cylinder in which, in accordance with the magnitude of actuation of a brake pedal under the action of the hydraulic circuit, a primary piston can be displaced in order to produce a brake pressure in a hydraulic brake circuit. For example, there may be provision for the primary piston to be displaced in a purely hydraulic manner by means of interaction with the hydraulic circuit with no direct coupling to a force input member, the hydraulic circuit acting as a servo pressure circuit. However, alternative configurations are also conceivable in which the hydraulic circuit is used in another manner in order to produce brake force or at least to reinforce brake force.

In another embodiment of the braking system, there is provision for the pressure store to be able to be connected or to be connected in fluidic terms to the delivery side of the pressure source by means of a supply line and to the main brake cylinder by means of a discharge line. The supply line allows the pressure store to be selectively charged, whilst the separate discharge line allows the pressure store to be discharged in order to provide the load pressure thereof to produce braking force at the main brake cylinder. This means that the load pressure of the pressure store can be used both at the intake side of the pump and to produce the brake force at the main brake cylinder.

Furthermore, there may be provision in another embodiment of the braking system for the supply line to have a fluid supply control device, in particular an actively controllable multi-way valve, to control the supply of hydraulic fluid to the pressure store. This measure allows the pressure store to be supplied with hydraulic fluid from the pressure source only when the fluid pressure from the pressure source must not be used in another manner for a braking operation. Otherwise, the fluid supply control device separates the pressure store from the pressure source in fluidic terms. It is also conceivable to briefly open the fluid supply control device during a braking operation in order to recharge the pressure store in the meantime.

The control of the braking system can be carried out using a number of parameters. Preferably, there is provided at least one pressure sensor which is arranged in the hydraulic circuit and which detects the hydraulic pressure in the hydraulic circuit. In a development of the invention, a plurality of pressure sensors may be provided, for example, additional pressure sensors on the pressure store, at the intake side and on the hydraulic fluid supply line to the main brake cylinder. In this context, there may further be provision for the fluid supply control device to be able to be controlled in accordance with the magnitude of the hydraulic pressure detected by the at least one pressure sensor.

In another embodiment of the braking system, there is provision for the discharge line to be constructed with a non-return valve which opens in a discharge direction. This ensures that whenever the hydraulic pressure is required from the pressure store for a braking operation, it can always be provided without delay.

Furthermore, in another embodiment of the braking system there may be provision for a hydraulic fluid supply line which leads away from the delivery side of the pressure source to be constructed with a non-return valve which blocks a reflux of hydraulic fluid to the delivery side of the pressure source. This measure prevents the hydraulic pressure from the pressure store—acting as a counter-pressure—from impairing the function of the pressure source, in particular the motor-driven pump.

Furthermore, in another embodiment of the braking system there may be provision for the hydraulic circuit to have an additional actively controllable multi-way valve, in particular a two-way solenoid valve, which is interposed between the main brake cylinder and a hydraulic fluid reservoir. With such an actively controllable multi-way valve, which is arranged in a corresponding bypass channel, hydraulic fluid can be specifically discharged from the main brake cylinder to the hydraulic fluid reservoir.

Furthermore, in another embodiment of the braking system the hydraulic circuit can also have an additional, actively controllable multi-way valve, in particular a two-way solenoid valve, which is interposed between the main brake cylinder and the supply line which leads to the pressure store. This allows the supply of hydraulic fluid from the pressure source or the pressure store to the main brake cylinder to be controlled.

The two above-mentioned additional, actively controllable multi-way valves thus allow the build-up and reduction of pressure in the main brake cylinder to be controlled in a specific manner by actively controlling and selectively switching between the respective opening and closing positions thereof.

In another embodiment of the braking system, there is provision for the primary piston to be mechanically decoupled from the brake pedal.

Other advantages of this invention will become apparent to those skilled in the art from the following detailed description of the preferred embodiments, which read in light of the accompanying drawing.

BRIEF DESCRIPTION OF THE DRAWING

FIG. 1 is a schematic overview of a braking system according to the invention.

DETAILED DESCRIPTION OF THE INVENTION

The FIGURE illustrates a braking system according to the invention which is generally designated 10. The system comprises a hydraulic circuit 12 which provides servo pressure and a brake cylinder assembly 14.

The brake cylinder assembly 14 comprises a main brake cylinder 16 in which a primary piston 18 is guided so as to be able to be displaced. A secondary piston 20 is further guided so as to be able to be displaced in the main brake cylinder 16 and is mechanically coupled to the primary piston 18 by means of a spring arrangement. The primary piston 18 comprises, with the main brake cylinder 16 and the secondary piston 20, a primary pressure chamber 22. The secondary piston 20 comprises, with the main brake cylinder 16, a secondary pressure chamber 24. The primary pressure chamber 22 and the secondary pressure chamber 24 are coupled in fluidic terms, via respective supply channels, to a hydraulic fluid reservoir 26 for supplying hydraulic fluid in the idle state illustrated in FIG. 1. Furthermore, the primary pressure chamber 22 and the secondary pressure chamber 24 are coupled in fluidic terms to a braking system 28 which can bring about braking of the wheels of a motor vehicle in a manner known per se.

The brake cylinder assembly 14 further comprises a pedal simulation device 30. In detail, the pedal simulation device 30 has a force input member 32 which is mechanically coupled to a brake pedal and which is connected to an operating piston 34 so as to transfer force. The operating piston 34 can be displaced in a piston chamber 36, delimiting operating chambers at both sides inside the piston chamber 36. Owing to a displacement of the operating piston 34 inside the piston chamber 36, a fluid, in particular gas, which is contained in the operating chambers at both sides of the operating piston 34 is displaced, via a throttle device 38, from one operating chamber into the other in each case and thereby produces a resistance with respect to a movement of the force input member 32. In addition to the pneumatically produced resistance, a resistance that results from a simulation spring arrangement 40 also acts on the force input member 32. This simulation spring arrangement 40 is constructed with multiple stages, that is to say, it has a spring of lesser spring hardness and a spring of greater spring hardness which can be compressed in a graduated manner, that is to say, with a progressive characteristic curve of spring.

Each pedal actuation, that is to say, each displacement of the force input member 32 is detected by means of a position sensor 42, the position sensor 42 transmitting a position signal to an electronic control unit 44, by means of which the presence of a pedal actuation can be established.

The braking system 10 according to FIG. 1 is configured in such a manner that a pedal actuation and a resulting displacement of the force input member 32 is not mechanically transmitted to the primary piston 18 but instead the energy produced during the pedal actuation is dissipated in the braking system 10. In order to carry out the braking operation, a hydraulic pressure is produced in an actuating pressure chamber 46 by means of the hydraulic circuit 12 in accordance with the magnitude of a detected brake pedal actuation and displaces the primary piston 18 and consequently the secondary piston 20 and thereby produces a build-up of pressure in the primary pressure chamber 22 and in the secondary pressure chamber 24. The primary piston 18 is consequently completely mechanically decoupled from the force input member 32 during normal operation of the braking system 10.

The construction of the hydraulic circuit 12 is intended to be explained below. The hydraulic circuit 12 is supplied with hydraulic fluid from the hydraulic fluid store 26. This is conveyed from the hydraulic fluid store 26 via a supply line 48 by a pump 50 which is driven by a motor 52. The pump 50 is coupled in fluidic terms to the actuating pressure chamber 46 by means of a hydraulic fluid supply line 54. Some branches extend from the hydraulic fluid supply line 54, starting from the pump 50. A first branch 56 is a discharge line which is coupled to a pressure store 58. In the discharge line 56, there is provided a non-return valve 60 which allows a flow from the pressure store 58 via the discharge line 56 into the hydraulic fluid supply line 54. Furthermore, the discharge line 56 has a return branch 62 which connects the pressure store 58 to the intake side of the pump 50.

An electromagnetically controllable two-way valve 64 is arranged in the return branch 62 and can be actuated by means of the electronic control unit 44. The pressure store 58 can further be connected to the hydraulic fluid supply line 54 by means of an additional two-way electromagnetic valve 66 via a supply line 68. An additional non-return valve 70 is arranged in the hydraulic fluid supply line 54 between the discharge line 56 and the pump 50 and blocks a reflux of hydraulic fluid to the delivery side of the pump 50.

Downstream of the supply line 68, an additional electromagnetically controllable two-way valve 72 is further provided in the hydraulic fluid supply line 54 and blocks the hydraulic fluid supply line 54 completely in the idle position thereof. A bypass channel 74 is further provided between the actuating pressure chamber 46 and the two-way valve 72 and connects the hydraulic fluid supply line 54 to the supply line 48. A two-way valve 76 is also provided in the bypass channel 74 and is open in the idle position thereof and can be controlled electromagnetically by means of the electronic control unit 44.

For reasons of completeness, it should also be noted that a non-return valve 78 is also provided in the supply line 48 and prevents a reflux of hydraulic fluid from the pressure store 58 and from the intake side of the pump 50 to the hydraulic fluid store 26. Furthermore, a pressure sensor 80 is provided in the hydraulic fluid supply line 54 and is also coupled to the electronic control unit 44 so that it is also possible to control the individual actively controllable two-way valves and the pump 52 on the basis of the detected pressure.

The hydraulic circuit 12 operates as follows: firstly, the pressure store 58 is filled by actuating the pump 50 and opening the control valve 66, so that it is placed in a "state of readiness". For example, the pressure store 58, in the charged state, provides a pressure of 60 bar. If, in this state of readiness, a braking action is initiated by the driver owing to an actuation of the brake pedal, the motor 52 is controlled in accordance with the magnitude of the control of the electronic control unit 44 and drives the pump 50 in a motorised manner. This conveys hydraulic fluid from the hydraulic fluid store 26 into the hydraulic fluid supply line 54. The actuating pressure chamber 46 is supplied with hydraulic fluid via the hydraulic fluid supply line 54 so that a pressure is built up therein which leads to the primary piston 18 being displaced towards the left-hand side in the FIGURE with no mechanical coupling of the force input member 32 and the primary piston 18 under the action of the hydraulic pressure which has built-up in the actuating chamber 56. A hydraulic pressure is consequently built up in the primary pressure chamber 22 and, with the secondary piston 20 being displaced, in the secondary pressure chamber 24.

The arrangement of the pressure store 58 in combination with the return branch 62, the two-way valve 64 which is arranged therein, and the non-return valve 78 has the purpose that, when a brake pedal is actuated, the two-way valve 64 can be opened from the closed rest position thereof so that the hydraulic pressure stored in the pressure store 58 is, on the one hand, present via the opened two-way valve 64 and the return branch 62 at the intake side of the pump 50 and, on the other hand, is also available via the discharge line 56 and the non-return valve 60 in the hydraulic fluid supply line 54. This results in the intake side of the pump 50 being acted on with a primary pressure and the hydraulic pressure from the pressure store 58 also being present at the same time in the hydraulic fluid supply line 54. The pump 50, in the event of a brake actuation in which the two-way valve 72 is switched to the through-flow position thereof illustrated in the FIGURE, must build up only the differential pressure which results from the difference between the desired active pressure required to achieve the demanded brake actuation in the actuating pressure chamber 46 and the charge pressure stored in the pressure store 58. The charge pressure stored in the pressure store 58 can therefore be used with no time delay to act on the actuating pressure chamber 46. However, it is also used at the same time as a primary pressure at the intake side of the pump 50 so that the pump can build up a relatively high overall active pressure in the actuating pressure chamber 46 with relatively little additional drive power. That is to say, by using the charge pressure in the pressure store 58 at the intake side of the pump 50, it is possible for the motor 52 of the pump to be able to be constructed with a relatively low level of power and furthermore relatively little electrical power is also required in order to build up the required desired active pressure in the actuating pressure chamber 46.

When the braking operation is complete, the two-way valve 72 is switched into the closed position (idle position) thereof and the two-way valve 76 into the opened position thereof (idle position). The pressure built-up in the actuating pressure chamber 46 can consequently decrease via the hydraulic fluid supply line 54 and the bypass channel 74, hydraulic fluid ultimately flowing away into the fluid reservoir 26 via the supply line 48.

In the passive state of the braking system 10, the two-way valves 64 and 72 can remain in the idle position thereof and consequently remain closed. The valve 66, which is closed in the idle position thereof, can be temporarily opened in order to recharge the pressure store 58 via the pump 50 which is then further or temporarily actuated. The charging operation can be monitored by means of the pressure sensor 80 and terminated at the correct time.

Furthermore, it should be noted that, during the braking operation, it is possible to selectively increase and decrease the pressure in the actuating pressure chamber 46 by selectively opening and closing the two-way valves 72 and 76. The overall control of all the two-way valves is carried out on the basis of the pressure monitored by the pressure sensor 80 by means of the electronic control unit 44.

Owing to the arrangement of the pressure store 58 according to the invention, a motor 52 with a relatively low level of power can be used for the pump 50. Since the pump power, according to the relationship:

$$P_{pump} = V * \Delta p,$$

$P_{pump}$ being the pump power,
V the fluid volume conveyed and
$\Delta p$ the differential pressure between the intake side and delivery side,
is directly dependent on the pressure differential at the pump, by using the charge pressure present in the pressure store at the intake side of the pump, there is a clear reduction in the pump power required.

The pressure store can be temporarily repeatedly charged during the braking operation by switching the valve 72 into the closure position thereof and opening the valve 66 with the pump 50 continuing to run. Furthermore, owing to the arrangement of the pressure store 58, the pressure gradient dynamic at the beginning of the braking operation can be improved, since the pressure stored in the pressure store 58 can be applied at the intake side of the pump via the return line 62 with the two-way valve 64 open and consequently the braking system, owing to the small pressure differential required between the intake side and the delivery side of the pump, can react more quickly. This is noticeable particularly at the beginning of the braking operation, when pressure peaks must be achieved.

If the increase of the active pressure or the pressure gradient dynamic is not necessary, the invention in any case has the advantage that a smaller, less powerful and consequently more cost-effective drive motor can be used. Furthermore, the load on the on-board electrical power system is also smaller owing to the low level of electrical power required for the motor.

It should be noted that the non-return valves mentioned above can also be individually replaced with actively controllable multi-way valves.

In accordance with the provisions of the patent statutes, the principle and mode of operation of the braking system have been explained and illustrated in its preferred embodiments. However, it must be understood that the braking system described herein may be practiced otherwise than as specifically explained and illustrated without departing from its spirit or scope.

The invention claimed is:

1. A braking system for a motor vehicle comprising:
    a brake cylinder assembly having a primary piston within a main brake cylinder;
    a braking system fluidly coupled between the main brake cylinder and motor vehicle wheels; and
    a hydraulic circuit for producing a braking force, the hydraulic circuit being constructed as a servo pressure circuit for actuating the primary piston within the main brake cylinder, the hydraulic circuit comprising:
        a pressure source for producing a hydraulic pressure;
        a pressure store, the pressure store being able to be supplied with hydraulic fluid from a delivery side of the pressure source if necessary; and
        an actively controllable multi-way valve interposed between the pressure store and the pressure source;
    wherein the actively controllable multi-way valve is a two-way solenoid valve; and
    wherein the actively controllable multi-way valve can be fluidly coupled and decoupled from an intake side of the pressure source.

2. The braking system according to claim 1, wherein in the main brake cylinder the primary piston can be displaced in accordance with the magnitude of an actuation of a brake pedal, under the action of the hydraulic circuit in order to produce a brake pressure in a hydraulic brake circuit.

3. The braking system according to claim 2, wherein the pressure store can be connected or is connected in fluidic terms to the delivery side of the pressure source by means of a supply line and to the main brake cylinder by means of a discharge line.

4. The braking system according to claim 3, wherein the supply line has a fluid supply control device, in particular an actively controllable multi-way valve, for controlling the supply of hydraulic fluid to the pressure store.

5. The braking system according to claim 1, wherein at least one pressure sensor is arranged in the hydraulic circuit for detecting the hydraulic pressure.

6. The braking system according to claim 4, wherein the fluid supply control device can be controlled in accordance with the magnitude of the hydraulic pressure detected by the at least one pressure sensor.

7. The braking system according to claim 3, wherein the discharge line is constructed with a non-return valve which opens in a discharge direction.

8. The braking system according to claim 1, wherein a hydraulic fluid supply line which leads away from the delivery side of the pressure source is constructed with a non-return valve which blocks a reflux of hydraulic fluid to the delivery side of the pressure source.

9. The braking system according to claim 2, wherein the hydraulic circuit has an additional actively controllable multi-way valve, in particular a two-way solenoid valve, which is interposed between the main brake cylinder and a hydraulic fluid reservoir.

10. The braking system according to claim 3, wherein the hydraulic circuit has an additional actively controllable multi-way valve, in particular a two-way solenoid valve, which is interposed between the main brake cylinder and the supply line.

11. The braking system according to claim 1, wherein the pressure source has a pump driven by a motor.

12. The braking system according to claim 1, further comprising a control device for evaluating detected hydraulic pressures and for controlling actively controllable components.

13. The braking system according to claim 2, wherein the primary piston is mechanically decoupled from the brake pedal.

* * * * *